Nov. 4, 1969 — R. SHATTUCK — 3,476,852
METHOD OF MOLDING THERMOPLASTIC ARTICLES
Filed July 14, 1967 — 4 Sheets-Sheet 1

Inventor:
Robert Shattuck
By: Thomas B. Hunter Atty.

Nov. 4, 1969    R. SHATTUCK    3,476,852
METHOD OF MOLDING THERMOPLASTIC ARTICLES
Filed July 14, 1967    4 Sheets-Sheet 2

Inventor:
Robert Shattuck
By: Thomas B. Hunter Atty

Nov. 4, 1969          R. SHATTUCK          3,476,852
METHOD OF MOLDING THERMOPLASTIC ARTICLES
Filed July 14, 1967                    4 Sheets-Sheet 3

Inventor:
Robert Shattuck
By: Thomas B. Hunter
Atty.

Nov. 4, 1969   R. SHATTUCK   3,476,852
METHOD OF MOLDING THERMOPLASTIC ARTICLES
Filed July 14, 1967   4 Sheets-Sheet 4

INVENTOR.
ROBERT SHATTUCK
BY
Woodhams, Blanchard & Flynn
ATTORNEYS

United States Patent Office 3,476,852
Patented Nov. 4, 1969

3,476,852
METHOD OF MOLDING THERMOPLASTIC ARTICLES
Robert Shattuck, Chicago, Ill., assignor to Borg-Warner Corporation, Chicago, Ill., a corporation of Illinois
Continuation-in-part of application Ser. No. 272,372, Apr. 11, 1963. This application July 14, 1967, Ser. No. 660,547
Int. Cl. B29f 1/10
U.S. Cl. 264—261                14 Claims

ABSTRACT OF THE DISCLOSURE

An injection molding method and apparatus wherein preformed plastics shapes are integrally welded together to form a finished article by means of injection molding. The preformed plastics shapes are placed within the mold cavity with small spaces existing between the edges of the preformed shapes. Molten plastic material is then injected into the spaces whereby the molten material causes the edges of the preform shapes to melt and thus form an integral weld or bond between the preforms. A variation of the above process exists whereby the preformed shapes are positioned with a mold core such that only a small portion extends therefrom. Similar plastic material is then injected into the mold cavity, which molten material causes a melting of the extending edges so as to cause an integral weld or bond therebetween upon cooling of the molten material within the mold cavity.

Cross-reference to related applications

This application is a continuation-in-part of copending application Ser. No. 272,372, filed Apr. 11, 1963, entitled Injection Molding Method and Apparatus, now abandoned.

Background of the invention

This invention relates to new and useful improvements in methods and apparatus for the fabrication of articles from plastics materials, and more particularly to methods and apparatus for injection molding of said articles.

The trend in materials of construction during the past several years has been the increased conversion from metals to plastics by designers and manufacturers of appliances, automobiles and other equipment. Weight reduction, improved appearance, better durability, and low tooling and material costs are some of several factors which have induced designers to substitute plastics for metals with increasing frequency. Although several different molding methods may be used by molders of thermoplastic materials, the injection molding method has a number of advantages which are well known to those skilled in the art.

Briefly described, injection molding comprises the injection, under high pressure, of pre-plasticized, flowable, plastics material into a closed mold cavity. While in the mold, the palstic is permitted to harden sufficiently to allow opening of the mold and removal of the molded article therefrom.

In spite of many advantages, injection molding also has certain limitations, particularly in the molding of relatively large articles, such as, for example, storage receptacles, refrigerator and freezer liners, radio and television cabinets, and the like. These limitations are also present in the injection molding of a large number of smaller articles during a single molding cycle or operation and in the molding of articles having a high profile or deep drawn contour, such as waste-baskets and other containers having a similar shape. These limitations also generally prevent, or render excessively expensive, the injection molding of many complicated articles and shapes having a large number of wall members and joints therebetween, such as battery cases and similar containers wherein the outer housing is formed with a plurality of integral interior walls dividing the housing into a plurality of small compartments.

The aforementioned limitations on the molding of articles are, for the most part, caused by three factors: (1) the projection area of the article being molded, (2) the distance the plastic must flow from the point of injection to the most distant point inside the mold cavity, and (3) the thickness of the walls of the molded article. With all other factors remaining unchanged, the farther the plastic material has to flow within the mold, the more it will cool. The flowability of the plastic decreases sharply below a certain temperature so that the cooler it gets, the greater the pressure required to force the material throughout the mold cavity. Similarly, the thinner the walls of the article, the harder it will be to squeeze the material between the mold elements forming the cavity. As the pressure required increases, the greater will be the force tending to urge the mold open, said force being directly proportional to the projected area of the mold cavity (or article) transverse to the mold clamping force.

ram, to kee pthe mold closed as the plastic material is

The use of high injection pressure imposes other design limitations on injecting molding machine. An injection molding machine always requires some sort of clamping device, commonly in the form of a hydraulic ram to keep the mold closed as the plastic material is injected. The force required on the injection side of the molding does not present any special difficulties since an injection ram having a relatively small diameter may be used. Such a ram would be capable of injecting material at high pressure with relatively little force. On the other hand, the clamping force or the force required to maintain the mold closed is a significant factor both in the structural design of the molding apparatus and of the hydraulic system for powering the clamping ram.

Summary of the invention

The present invention offers a novel solution to many of the aforementioned problems by the use of preformed plastic shapes which are either completely placed within or have a portion thereof extending into the mold cavity, the preformed shapes constituting a portion of the final molded article. In one form of the invention, preformed shapes are placed within the mold cavity and positioned with their edges closely adjacent each other so as to leave only a small space therebetween. Similar molten plastic material is then injected into the mold cavity, the injected material being required to flow only to the small space which exists between the preforms, which space is only a fraction of the total volume of the mold cavity and thus both the injection pressure and the projected area subject to the injection pressure are substantially reduced. Further, the mold material injected into the mold cavity causes a melting of the edges of the preforms whereby an integral weld or bond is formed between the preforms upon cooling the plastic material so as to form the final molded article.

In another form of the invention, the preformed shapes are positioned within a mold core, in such a manner that only a small portion or edge extends therefrom. The injection volume of the mold is thus substantially minimized since it constitutes only a portion of the total volume of the finished article and thus both the injection pressure and the projected area subject to the injection pressure are substantially minimized or reduced. As is true in the first form of the invention, the molten material within the mold cavity causes a melting of the edges of the preform and thus causes a welding action to take place whereby the preforms are integrally connected with the material contained in the mold cavity upon cooling thereof.

Accordingly, the principal objects of the present invention are:

(1) To provide an improved method of fabricating articles from plastics materials.

(2) To provide an improved method of fabricating plastics articles by injection molding techniques which greatly reduce the high clamping pressures ordinarily required.

(3) To provide an improved method of fabricating plastics articles by injection molding, as aforesaid, which minimizes the area into which plastics material is injected relative to the size of the article.

(4) To provide an improved method of fabricating plastics articles by injection molding, as aforesaid, in which the articles are of large size and/or of complicated shapes and configurations.

(5) To provide an improved method of fabricating plastic articles, by injection molding, as aforesaid wherein preformed plastics shapes are inserted into the mold cavity and integrally connected together by injection molding.

(6) To provide an improved method of fabricating plastics articles, as aforesaid, wherein preformed shapes are positioned so as to have a portion thereof extending into the mold cavity, the preforms being integrally welded to a finished article formed within the mold cavity by means of injection molding.

(7) To provide an improved method of fabricating plastics articles, as aforesaid, wherein completed articles can be efficiently and inexpensively manufactured by integrally welding together preformed plastic shapes into the completed article by means of injected molding.

(8) To provide an improved method of fabricating plastics articles, in particular battery cases, where the completed case is integrally welded together from preformed plastic shapes.

(9) To provide an improved molding apparatus especially adapted for use in carrying out the process set forth above.

Other objects and advantages will be apparent from the following detailed description taken in conjunction with the drawings attached herewith.

Detailed description

Figures 1, 2, 3:
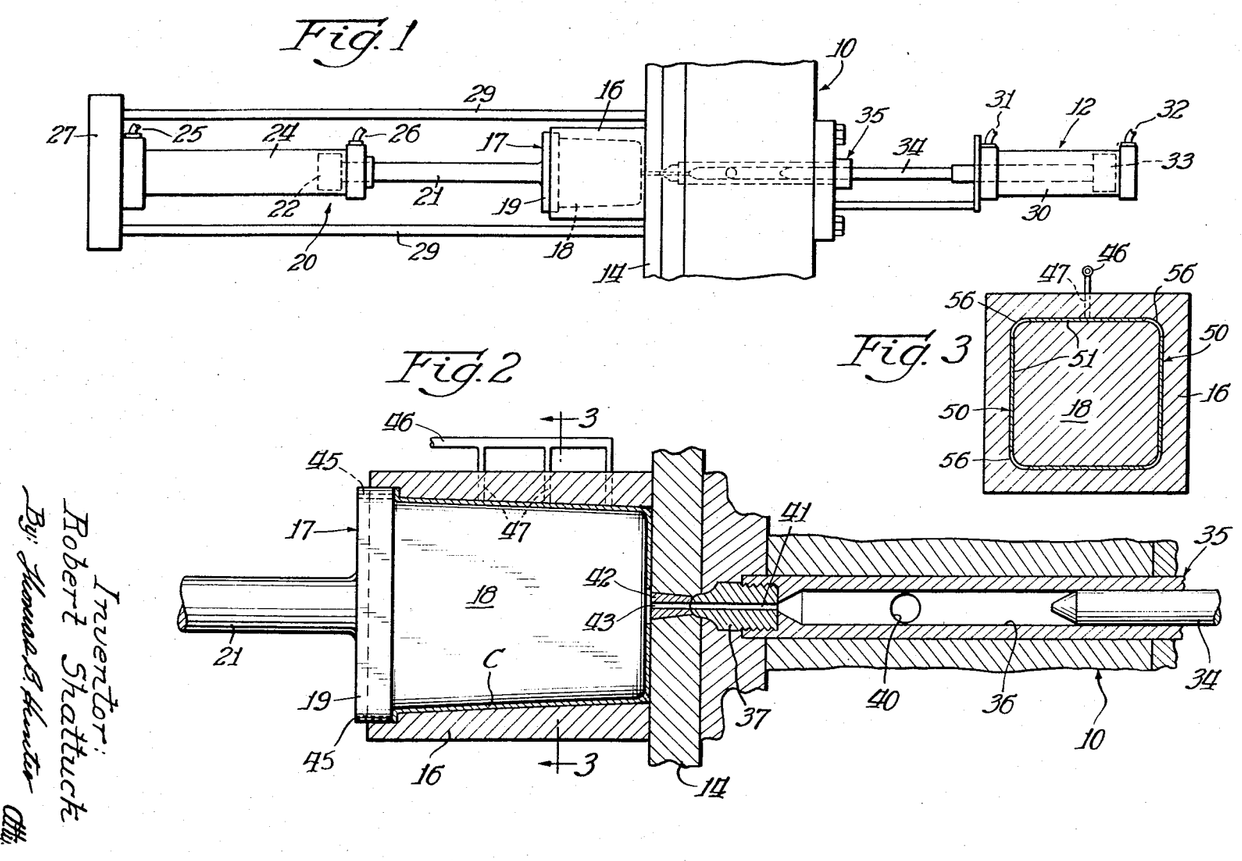
FIGURE 1 is a side elevation view of a molding apparatus employed in the practice of the present invention.
FIGURE 2 is a detailed cross-sectional view of the mold elements and injection ram with the mold in the closed position.
FIGURE 3 is a cross-sectional view taken along the plane of line 3—3 of FIGURE 2.

Referring now to FIGURES 1 and 2, there is shown a molding apparatus comprising a frame, indicated generally by numeral 10, on which there is mounted an injection unit 12 for injecting plastic material into a mold and a plasticizing chamber (not shown). A first platen 14, preferably heated, is mounted in fixed relation with respect to the frame and supports a fixed, female mold element 16. A movable, male mold element 17 carried by hydraulic ram unit 20 includes a first portion 18 insertable within mold element 16 to form the mold cavity C and a second portion engageable with the fixed mold element to close the same.

Mold closing unit 20 comprises ram 21 which may be integral with mold element 17 and a piston 22 received within fluid cylinder 24. Fluid cylinder 24, supplied with hydraulic fluid under pressure by conduits 25, 26, is mounted on a second platen 27, said second platen being connected to platen 14 by a plurality of strain rods 29.

On the injection side of the mold, injection unit 12 comprises a fluid cylinder 30 supplied by conduits 31, 32, and an injection ram or plunger 34 received within ram cylinder 35. Piston 33, connected to the ram, is slideable within the fluid cylinder 30 to actuate the ram in a manner known to those skilled in the art. The ram cylinder 35 is supported by the frame and includes a cylindrical bore 36, through which the ram extends, and a terminal portion or discharge nozzle fitting 37 which is adapted to be received within a complementary pilot opening in the platen 14.

As best shown in FIGURE 2, ram cylinder bore 36 is in communication with the plasticizing chamber (not shown) through an intersecting passage 40 and communicates, at one end, with a smaller bore 41 in the discharge nozzle fitting. When the nozzle structure is in position for injection, the bore 41 is coaxially aligned with sprue bushing 42 forming the sprue opening 43 in platen 14, said sprue opening extending into the interior of the fixed mold element 16 to cavity C.

If the apparatus described above were to be operated in the conventional manner, the injection ram would be withdrawn to the position shown in FIGURE 2 by supplying hydraulic fluid through conduit 31 to apply pressure to the left-hand side of piston 33. The movable mold element 18 would be moved to a position to close the mold (as shown in FIGURE 2) by supplying hydraulic fluid through conduit 25 to apply pressure to the left-hand side of piston 22. Plastic material is supplied from the plasticizing chamber (not shown) through passageway 40 to the injection ram cylinder to fill the cylinder bore 36 with material at a temperature and consistency suitable for injection. While still maintaining the mold closed, the plunger or ram 34 is moved to the left by the application of pressure against the right-hand face of piston 33 from the supply of hydraulic fluid through conduit 32. A suitable valve (not shown) prevents material from moving back through passage 40 so that the material is forced through the discharge nozzle bore 41, and the sprue opening 43 into the mold cavity C to fill the same.

It will be noted that vents 45 are provided in the movable mold element 18 to permit the air inside the mold cavity to be vented to atmosphere during injection. Also, vacuum holding means are provided on the fixed mold element for the purpose to be described later. The vacuum unit comprises a manifold 46 connected to any suitable source of vacuum (not shown) and communicating with the interior of the mold element 16 through a series of apertures 47. Although only a single vacuum holding means is shown in the drawings, it should be understood that one or more of these units may be provided on each side of the mold as desired.

As the material is forced further and further from the sprue, the material begins to harden and the pressure required to move the material through the restricted interstices of the mold cavity, particularly in the regions remote from the point of injection, is substantial. This pressure, which is acting against the entire surface of the movable mold member, tends to urge the mold open, and unless sufficient back force is supplied by the closing ram, the mold elements will separate, causing the material to flash and thereby producing a defective and worthless article. The greater the projected area, which may be defined as the effective area against which the plastic material pressure acts in a direction to open the mold, the greater the mold closing force that is required.

It is therefore an important aspect of the present invention to provide a molding method which will substantially reduce the mold closing force required to injection mold a given article. This method comprises the steps of providing a mold cavity with a plurality of preformed plastic shapes placed within or extending into a portion of said mold cavity, and then injecting plastic material compatible with the composition of the preformed shapes into the remaining portion of said mold cavity. These preformed shapes, constituting an integral portion of the final molded article, include sheets, panels and other similar forms which may be bent, shaped, molded or otherwise contoured to fit a particular mold. Since one of the objects of the invention is to avoid the necessity of deep-drawing large plastic sheets, the preformed shapes are preferably designed with a low profile contour.

It is believed that a discussion of a few representative examples of different molding techniques for fabricating receptacles or similar articles will be useful in making clear the principles of the present invention. Accordingly, attention is directed to FIGURES 3–5 which illustrate a molding method, the practice of which includes the steps of placing a plurality of preformed shapes into the mold cavity to line the same prior to closing the mold by insertion of the movable mold element. In this first example, each preformed shape comprises side wall portions 51, a triangular base segment 52 and a lip portion 53. These preformed shapes are temporarily secured to the inside of the mold element 16 in the arrangement shown in FIGURE 4 by any suitable means. One such means may comprise a vacuum holding unit 46, 47 which was previously described, but it should be understood that various other means may also be employed, such as, for example, adhesives, securing pins, clips and other such devices.

Figures 4, 5, 6, 7, 8:
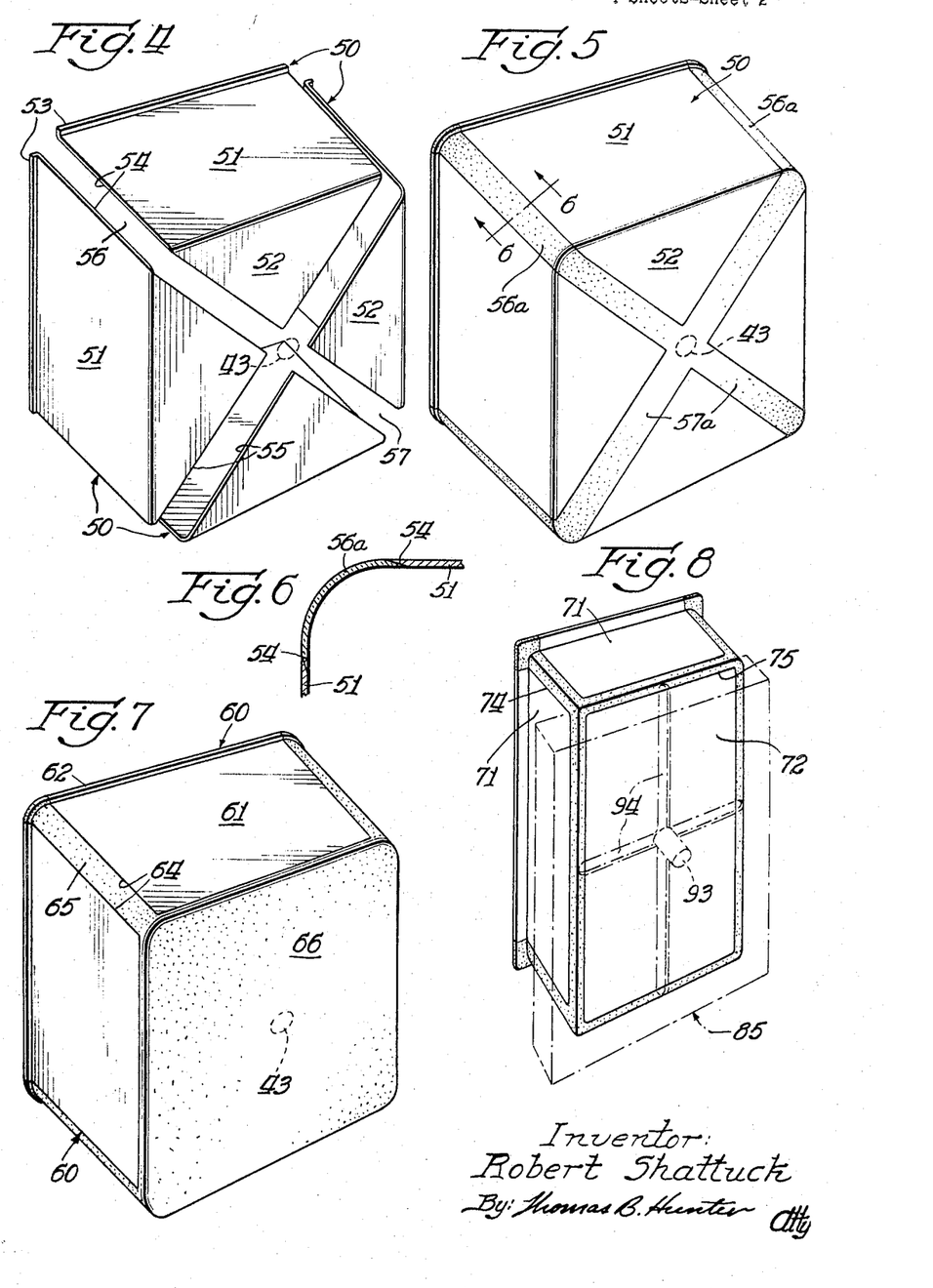
FIGURE 4 is an isometric view showing a series of preformed shapes in the configuration in which they are placed in the mold.
FIGURE 5 is an isometric view of the completed article as fabricated from the shapes illustrated in FIGURE 4.
FIGURE 6 is a cross-sectional view taken along the plane of line 6—6 of FIGURE 5.
FIGURE 7 shows a modified article fabricated by using a somewhat different technique than that employed in making the article shown in FIGURE 5.
FIGURE 8 shows still another modification of an article using a different molding technique.

As best shown in FIGURE 4, preformed shapes 50 are arranged in the mold cavity so that a space or channel 55 is formed adjacent the edges of the side-wall portions. The edge portions of triangularly shaped base sections 52 are similarly spaced apart to provide a channel therebetween leading from the vicinity of the sprue opening 43 to the space 56 between the edges of the sidewall portions 51. When the plastic material is injected in the manner indicated above, the material flows through the channel 57 between the edges of the base segments 52 and through corner portions 55 filling up all portions of the mold cavity not occupied by the freformed shapes. When the article is withdrawn from the mold, the shapes have been, in effect, welded together by the injected material 56a, 57a to form a smooth contour and to provide a unitized, rigid article having high impact strength and an attractive appearance.

In a preferred manner of practicing the invention, the juncture of the preformed and injected portions is formed in the fashion best illustrated in FIGURE 6. It will be noted that the edges of side walls 51 are chamfered or bevelled so that when the material is injected to form the weld between the adjacent edges of said walls, a scarfed joint 54 is created. Since the respective contiguous portions of the shapes 50 and the injected material 56a have a greater area than if the edges were cut perpendicular to the plane of the sheet, this results in strong, durable bond. In like manner, the edges of the base segments 52 may also be chamfered.

Since the pressure building up adjacent the back face of the movable mold element is sharply reduced merely by providing the side walls with a preformed liner, it is possible to dispense with the base segments of the preformed shapes and inject the corners *and* the entire base of the molded article. The steps involved in fabricating the container shown in FIGURE 7 comprise the positioning of preformed shapes 60, constituting only the side walls of said container, into the mold so as to provide spaces between each of the side edges 64 of said side walls. The mold is then closed and thermoplastic material is injected through the sprue opening, indicated generally by numeral 43, so that the injected material flows into spaces 65 and also forms the entire base portion 66. In this example, the area against which the pressure acts is considerably larger than in the prior example; however, the reduction in the peripheral area through which the material must be squeezed to fill out the cavity permits a reduction in the injection pressure acting against the base of the movable mold element.

In another modification, the side walls and the base are constructed of preformed shapes. As shown in FIGURE 8, side walls 71 are inserted into the mold cavity together with the base 72 and plastic material is injected into the spaces 74 between the edges of side walls 71 and into spaces 75 between the bottom (base) edge of the side wall 71 and the base 72. Since no channel is provided by the preformed shapes for the flow of material from the sprue opening 93 to the points where injection is required, a runner system comprising runners or channels 94 are provided leading from the sprue opening 93 to the injection points. A clearer understanding of the modified mold structure will be facilitated by reference to FIGURE 9 which shows a modified mold system adapted for molding of the articles shown in FIGURE 8.

Figure 9:
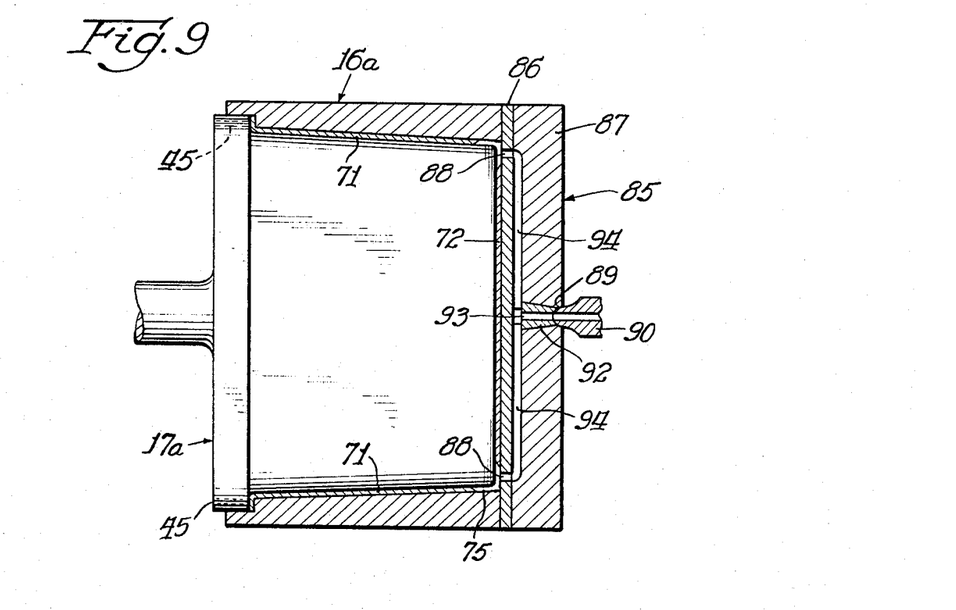
FIGURE 9 is a cross-sectional view showing the design of the mold used in the fabrication of the article shown in FIGURE 8.

The aforementioned mold comprises a fixed mold element 16a and a movable mold element 17a adapted to form a cavity therebetween, said movable mold element being provided with vents 45 communicating with the mold cavity for venting air to atmosphere during injection. The platen 85 is generally heated and comprises two sections 86, 87 mounted together. Section 86 is provided with a plurality of injection ports 88 spaced around the edge of the mold cavity adjacent to base thereof. Platen section 87 is provided with a pilot opening 89 for the reception of injection nozzle 90, said pilot opening communicating with a sprue opening 93. Channels 94 are provided in the platen section 87 leading to each of the injection parts 87. The platen is generally heated to maintain the plastics material in a fluid state between the injection cycles and to prevent hardening of the material in the channels and ports.

Figure 10:
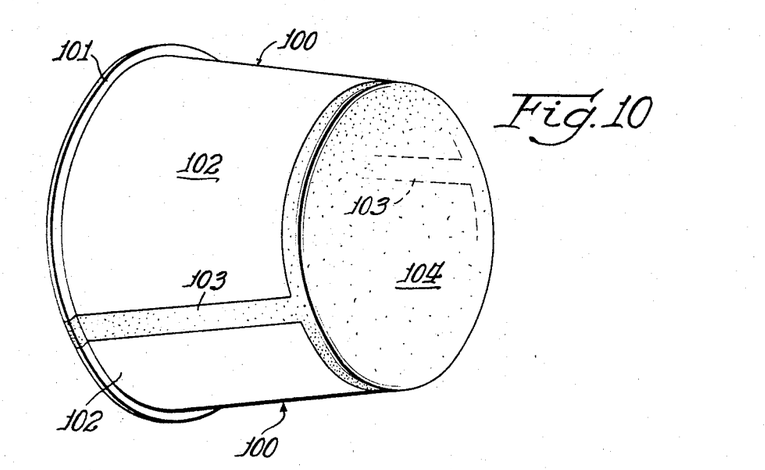
FIGURE 10 shows still another modification of an article having a generally cylindrical shape.

It is obvious that articles having a wide variety of shapes and configurations may be readily molded by employing the principles of this invention. While the prior description is related primarily to receptacles of rectangular configuration having substantially uniform wall thickness, it is apparent that cylindrical and other shaped articles can be constructed without departing from the aforementioned principles. Accordingly, as shown in FIGURE 10, a receptacle having a cylindrical form is illustrated, said article comprising a pair of semi-cylindrical sections 100, 101 which correspond to the preformed shapes described in connection with the other examples. These preformed shapes 100, 101 may be formed by heating sheets of plastics material and then bending the same over a form or mandrel. After placing the preformed shapes in a cylindrically shaped mold, plastics material is injected to fill the space 103 between the edges of said shapes and also the base 104.

Still another modification of the present invention is illustrated in FIGURES 11–14 wherein the injection molding process of the present invention is used to form large and complicated articles. In this modification, the injection or mold cavity constitutes only a portion of the finished article with the remainder of the finished article being comprised by preformed plastic shapes which are welded to the molded portion by having the edges of the preformed shapes extend into the injection cavity during the molding operation so as to form an integral weld or bend therebetween.

Figure 14:
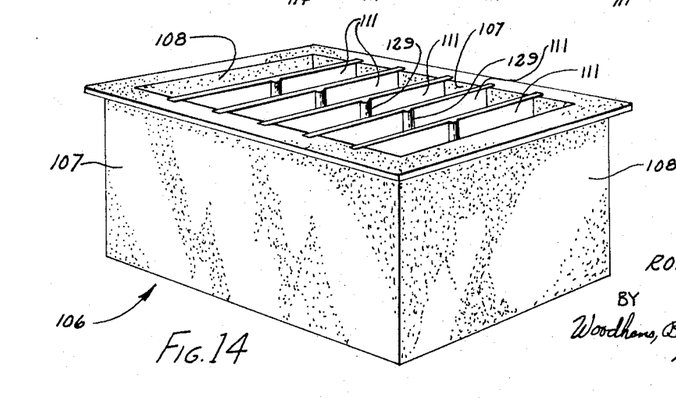
FIGURE 14 illustrates the finished article formed by the mold illustrated in FIGURES 11–13.

FIGURE 14 illustrates an article formed by the above-mentioned method which article comprises a battery case 106 having a plurality of panels or partitions 111 located within the opening thereof so as to divide the same into a plurality of sealed compartments. The formation of the complete battery case 106 with the partitions 111 therein by means of conventional injection molding techniques would be extremely difficult due to the fact that the outer housing plus the interior partitions create a very large injection area which would consequently require an extremely large injection pressure in order to be able to successfully form the partitions 111 within the outer housing. Furthermore, the partitions 111 must be integrally connected to the outer wall members so as to insure that each compartment is effectively sealed from one another. These compartments are also of thin-walled construction so as to maintain the battery case as light and as small as possible. Thus, these additional factors essentially render impossible or at least impractical, the formation of the complete battery case by means of conventional injection molding techniques.

On the other hand, the plastic battery case illustrated in FIGURE 14 can be successfully injection molded by means of the process of the present invention. The battery case 106 consists of a pair of side walls 107 interconnected to a pair of end walls 108, the upper edge of the case being formed with an integral lip portion 109. The case 106 also has a bottom wall (not shown) interconnected to the side and end walls so as to close off the case and effectively form a rectangular compartment therein. The side walls, end walls, bottom wall and lip are all simultaneously and integrally formed by means of injection molding. The rectangular opening formed within the casing 106 is divided into a plurality of compartments by means of a plurality of preformed panels or partitions 111 which are integrally connected to the side walls and the bottom wall, respectively, so as to effectively seal the individual compartments one from another. The partitions 111 are preformed plastic shapes which are integrally welded or bonded to the molded casing 106 during the injection process.

The casing 106 is formed within a mold 112 (see FIGURE 13) which comprises upper and lower mold halves 113 and 114 respectively. The lower mold half is formed with an integral block or core 117 thereon which extends into the opening 118 formed within the upper mold half 113 so as to define an injection cavity 119 therebetween. The injection cavity 119 consists of a pair of parallel side channels 121 communicating with a pair of parallel end channels 122, which channels all connect to a rectangular opening 123 formed between the top of the block 117 and the upper mold half 113. The lower mold half 113 has a opening 124 centrally located therein, which communicates with the rectangular opening 123 such that molten plastics material can be injected into the cavity 119 by any conventional injection molding machine, FIGURES 4–8 since the preformed shapes utilized in 106 to be formed, the side channels 121 corresponding to the side walls 107, the end channels 122 corresponding to the end walls 108, and the rectangular opening 123 corresponding to the bottom wall of the casing, respectively.

Figure 11:
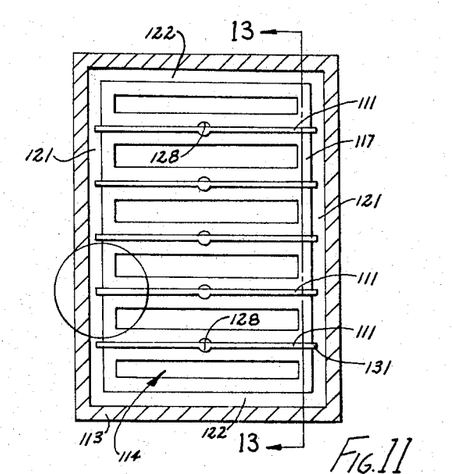
FIGURE 11 is a top view taken along the line 11—11 of FIGURE 13 showing the mold used in still another modification of the present invention.
Figure 12:
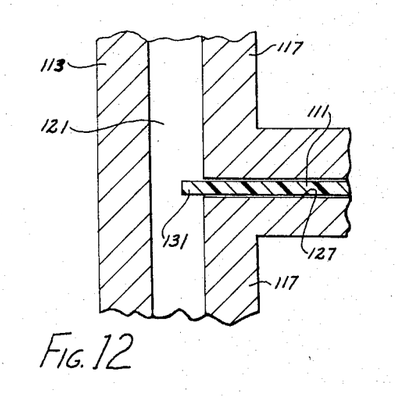
FIGURE 12 is an enlargement of the area enclosed within the circle of FIGURE 11.
Figure 13:
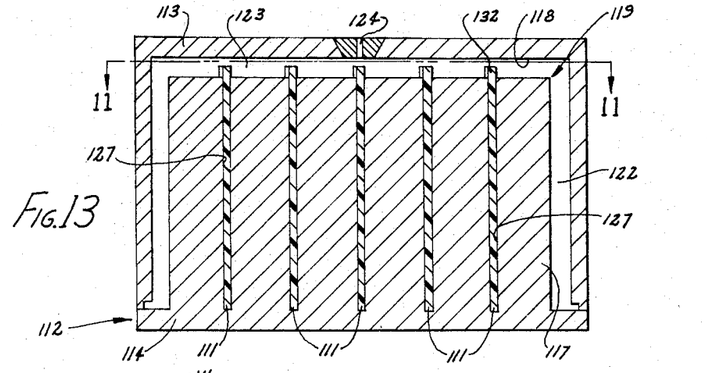
FIGURE 13 is a sectional view taken on the line 13—13 of FIGURE 11 showing a sectional elevational view of the complete mold.

As illustrated in FIGURES 11–13, the mold core 117 is formed with a plurality of parallel slots 127 for receiving the preformed thermoplastic partitions 111 therein, the core 117 is further formed with a plurality of grooves 128 therein, which grooves are interconnected with the slots 127. The preformed partitions 111 have a ridge or projection 129 formed thereon, which ridge has a configuration substantially identical to the configuration of the groove 128 whereby the projection 129 is received within the groove 128 when the partitions 111 are inserted into the slots 127 so as to properly position the partitions with respect to the mold cavity. When the partitions 111 are properly positioned within the slots 127 of the lower mold member, the ends 131 project outwardly into the side channels 121 of the injection cavity 119. Similarly, the upper edges 132 of the partitions 111 also project outwardly into the rectangular opening 123 of the mold cavity. Injection of molten plastics material through the opening 124 into the cavity 119 causes the molten material to come into contact with the edges 131 and 132, causing the edges to melt and thus forming an integral bond between the preformed plastic partitions 111 and the outer shell of the casing 106 formed by the cavity 119. The central portions of the partitions 111 are prevented from melting due to the fact that they are effectively isolated from the molten material contained in the cavity 119 by means of the mold core 117.

The use of a ridge 129 on the partitions 111 for aligning the same with respect to the mold is generally preferable since, in the absence of such an alignment means, the partitions may become improperly positioned within the mold such that one end 131 thereof may extend too far into the channel 121 so as to effectively block off the same and thus prevent the flow of molten material therethrough and thereby hinder or prevent the formation of a good weld between the partition and the side wall member. Further, the mold core 117 can be formed with grooves 128 on both sides of the slots 127 if desired and the partitions 111 can be formed with ridges 129 on either one or both sides of the partition if so desired.

The molding method of the present invention as described above has proven highly successful and desirable since it not only eliminates the need for high clamping pressures on the mold sections, but it also eliminates the need for utilizing or imposing high clamping forces onto the individual preforms themselves so as to hold the same while the molding operation is being preformed. The elimination of these preform clamping pressures is accomplished primarily by positioning the preforms within the mold cavity in such a manner that a substantial balance of forces exists thereon such that no external clamping force is needed to maintain the preform in position during the molding operation.

Referring to the embodiment illustrated in FIGURES 11–14 for example, it will be observed that plastic material injected into the mold cavity 119 will act and exert a pressure against the opposed edges 131 of the preformed panels 111. Thus, the forces on the two sides will be in direct opposition to each other such that a balance of force will exist across the preformed panel 111.

Similarly, the injected material will exert a pressure against the upper extending edge 132 of the panels 111. This pressure will be transmitted through the panel and be exerted directly onto the lower mold section 114 due to the abutting engagement between the panel 111 and the bottom surface of the groove 127. Thus, the preformed panels or shapes do not have to have any frictional clamping force applied thereto so as to hold the same during the molding operation.

It will be readily apparent that the above description applies equally well to the embodiments illustrated in these embodiments are positioned in an analogous manner as in the embodiment illustrated in FIGURES 11–14, and thus the article can be formed without requiring the preform shapes to be clamped within the mold section.

From an inspection of FIGURES 11–14, it will be obvious that the present invention permits the efficient and inexpensive formation by injection molding of articles of complicated shapes not previously formable by injection molding techniques. By forming only a relatively simple portion of the complete article by injection molding, with the remainder of the article being comprised of preformed plastic members which project into the molded portion so as to be integrally welded or bonded thereto, it is possible to easily and simply form complicated plastic articles having all portions thereof integrally interconnected in the same manner as if the complete article had been simultaneously formed by injection molding. Furthermore, the finished article produced by this technique is generally of higher strength and uniformity than could previously be obtained if the complete article were formed by injection molding. It is of course obvious that the battery case of FIGURES 11–14 is merely illustrative of the present invention since the principles there represented can be utilized to form many other complicated shapes and configurations.

The compositions of the injected plastic materials used in the present invention are not critical since any plastic that can be injection molded is suitable. The only requirement for the composition of the preformed shapes is that they must be compatible, in the sense of being heat weldable, with the injected material. Thermoplastics have been found to be well suited for the present invention, with one plastic material which has been found to be particularly satisfactory being known as ABS, a graft polymer of acrylonitrile, butadiene, and styrene.

It should be apparent from the foregoing description that the techniques used in carrying out the present invention permits the injection molding of larger articles with substantially smaller mold closing forces. However, use of the present invention may also be highly desirable for the molding of small articles since the present technique permits articles to be formed while requiring only small quantities of molten plastic material. Thus, the amount of plasticizing equipment and related accessories can be minimized.

The embodiments of the invention in which an exclusive property or privilege is claimed are defined as follows:

1. A method of molding integral structures from plastics materials comprising the steps of:
   providing a first mold element with a plurality of slots formed therein;
   positioning a plurality of substantially flat preformed plastic sheets within the slots in said first mold element in such a manner that at least some of the edge surfaces of said preformed sheets extend beyond the peripheral surface of said first mold element;
   closing said first mold element with a second mold element to form a mold cavity defined by the inner peripheral surface of said second mold element and the outer peripheral surface of said first mold element, said edge surfaces of said preformed sheets facing said mold cavity; and
   injecting a compatible thermoplastic material into said mold cavity to completely fill said cavity with said injected thermoplastic material and to melt the edge surfaces of said preformed sheets to thus form an integral structure.

2. A method of molding an integral structure from plastics material according to claim 1, comprising the additional steps of:
   positioning said preformed sheets within said slots such that the injected plastics material contacts at least three of the edge surfaces thereof with a fourth edge surface being positioned in abutting engagement with one of the mold elements; and
   exerting a pressure on two opposite edge surfaces of said sheets by said injected plastics material with the pressure exerted on said two opposite edge surfaces being balanced across said preformed sheet to assist in holding said sheet stationary within the mold cavity, and the injected plastics material exerting pressure on a third edge surface opposite said fourth edge surface whereby the pressure imposed on the third edge surface is transferred through the sheet directly to said one mold element.

3. The method of molding integral structures from plastics materials, comprising the steps of:
   providing a mold having surfaces defining a mold cavity therein and means for injecting plastics material into said cavity;
   arranging a plurality of thin preformed shapes of plastics material wholly within said cavity in such a way as to occupy a substantial portion of said cavity and provide narrow, elongated spaces between opposing edge surfaces of adjacent shapes, said spaces having a thickness substantially equal to the thickness of said opposing edge surfaces defining same, and said shapes conforming to the shape of said mold cavity and having the opposite sidewalls thereof positioned substantially adjacent said surfaces defining said mold cavity; and
   injecting a compatible plastics material into said narrow, elongated spaces to fill the same and weld said shapes into an integral structure.

4. A method of molding an integral structure from plastics material, comprising the steps of:
   providing a mold having a mold cavity formed therein and means for injecting plastics material into said cavity;
   arranging a plurality of separate preformed shapes of plastics material wholly within said cavity in such a way as to cover portions of said cavity and provide spaces between adjacent shapes, such shapes conforming to the shape of said mold cavity and having at least two pairs of substantially opposed edge surfaces;
   positioning said preformed shapes within said cavity such that injected plastics material exerts pressure against at least one pair of opposed edge surfaces and one edge surface of the other pair of edge surfaces, at least one of said shapes having the other edge surface of said other pair positioned in abutting engagement with the mold;
   exerting a pressure against said one pair of opposed edge surfaces due to the plastics material contained within said spaces with a balance of pressure existing across said one pair of opposed edge surfaces;
   exerting a pressure against said one edge surface of said other pair due to the plastics material contained within the spaces with the pressure being transferred through said one shape directly to the sheets by means of the abutting engagement between the mold and the other edge surface of said other pair; and
   welding said shapes into an integral structure due to the plastics material contained within said spaces contacting the edge surfaces of the preformed shapes and melting said edge surfaces to form an integral, one-piece structure of plastics material.

5. A method of molding an integral structure from the plastics material according to claim 9, comprising the additional steps of:
   providing a first mold element having a recess formed therein and means for injecting plastics material into the central portion of said recess;
   temporarily securing said preformed shapes of plastics material on the inside surface of said recess, said shapes being arranged to provide a space or channel between adjacent shapes and adapted to form the walls of the final molded article;

closing said first mold member with a second mold member to provide a mold cavity therebetween partially occupied by said shapes.

6. A method of molding integral structures having substantially uniform wall thickness from thermoplastic materials, comprising the steps of:

providing a first mold element having a recess formed therein and means for injecting thermoplastic material into said recess;

lining said recess with a plurality of separate preformed sheets of thermoplastic material in such a way as to cover portions of said recess and provide spaces between adjacent sheets, said sheets conforming to the shape of said recess;

closing said first mold element with a second mold element to form a series of interconnected interstices defined by said first and second mold elements and said sheets, said series of interconnected interstices defining an injection region;

injecting a compatible thermoplastic material into a central portion of said injection region to fill the interstices; and welding said preformed sheets into an integral structure by means of the thermoplastic material injected into the spaces between adjacent sheets whereby the injected thermoplastic material contacts the edge surfaces of the adjacent preformed sheets and melts said edge surfaces to form an integral one-piece structure of plastic material.

7. A method of molding integral structures from thermoplastic materials according to claim 6, wherein the spaces between adjacent sheets have a thickness substantially equal to the thickness of the opposing edge surfaces of said adjacent sheets.

8. A method of molding integral battery cases from plastic material comprising the steps of:

providing a first mold element having a substantially rectangular mold block extending therefrom, said block having a plurality of substantially parallel slots formed therein;

positioning a plurality of preformed rectangular plastic sheets within the parallel slots in said block in such a manner that the edge surfaces of said preformed sheets extend beyond the peripheral surface of said block;

providing a second mold element with a rectangular recess therein, the width, length and depth of said recess being slightly greater than the width, length and height of said block, respectively;

closing said first mold element with said second mold element to form a mold cavity therebetween defined by the inner peripheral surface of said recess and the outer peripheral surface of said block, said edge surfaces of said preformed sheets extending into said mold cavity; and injecting a compatible plastic material into said mold cavity to fill the same so as to form a housing for said battery case, said injected material causing the edge surfaces of said sheets to melt so as to weld said sheets to said housing to form an integral structure whereby said housing is formed with a plurality of sealed compartments therein.

9. A method of molding integral structures from plastics material, comprising the steps of:

providing a mold having a mold cavity formed therein and means for injecting plastics material into said cavity;

arranging a plurality of separate preformed shapes of plastics material entirely within said cavity and with opposing edge surfaces of adjacent preformed shapes at least in part defining spaced flow zones;

positioning said separate shapes within said cavity such that injected plastics material exerts pressure against some of the edge surfaces for assisting in holding said preformed shapes stationary within said mold cavity;

injecting a compatible plastics material into said flow zones for filling same;

exerting a pressure on at least two opposite edge surfaces of some of said shapes by said injected plastics material with the pressure exerted on said two opposite edge surfaces being substantially balanced across said preformed shapes for assisting in holding said preformed shapes stationary within said mold cavity; and welding said preformed shapes into an integral structure due to the plastics material injected into the flow zones contacting the edge surfaces of the preformed shapes and melting said edge surfaces to form an integral, one-piece structure of plastics material.

10. A method of molding integral structures according to claim 9, wherein said flow zones have a thickness substantially equal to the thickness of the opposing edge surfaces of said adjacent preformed shapes.

11. A method of molding integral structures from plastics material, comprising the steps of:

providing a mold having a mold cavity of substantially uniform thickness formed therein and means for injecting plastics material into said cavity;

arranging a plurality of preformed shapes of plastics material entirely within said cavity and with the opposing edge surfaces of adjacent preformed shapes at least in part defining spaced flow zones with said flow zones having a thickness substantially equal to the thickness of the opposing edge surfaces of said adjacent preformed shapes;

positioning said shapes within said cavity such that injected plastics material exerts pressure against some of the edge surfaces for assisting in holding said preformed shapes stationary within said mold cavity;

injecting a compatible plastics material into said flow zones for filling same;

exerting a pressure on at least two opposite edge surfaces of said shapes by said injected plastics material with the pressure exerted on said two edge surfaces being at least partially balanced across said preformed shapes for assisting in holding said preformed shapes stationary within said mold cavity; and welding said preformed shapes into an integral structure by means of the plastics material injected into the flow zones.

12. Molding apparatus comprising:

a first mold element having a base and a mold core interconnected thereto;

a second mold element having a recess therein adapted to define a mold cavity between said first and second mold elements with said mold core being received within said cavity, a clearance existing between the outer periphery of the mold core and the inner periphery of the second mold element so as to define an injection region therebetween;

means defining a plurality of substantially straight slots within said mold core adapted to receive therein preformed plastic sheets such that the edge surfaces of said sheets project into said injection region; and means for injecting plastic material into a central portion of said injection region to fill the same and melt the edge surfaces of said sheets so as to weld same into an integral structure.

13. Molding apparatus as defined in claim 12, further including alignment groove means interconnected with said slots, said groove means cooperating with mating ridges formed on said preformed sheets so as to permit said edge surfaces to be properly positioned with respect to said mold cavity.

14. Molding apparatus comprising:

a first mold element having a mold surface thereon;

a second mold element having a mold surface thereon with said second mold element being adapted to be adapted to be connected to the first mold element with the respective mold surfaces of said first and second mold elements being spaced from one another to define an injection region therebetween;

means defining a slot within one of said mold elements, said slot having a pair of opposite ends opening into said injection region, said slot being adapted to receive therein a preformed plastic shape in such a manner that opposite edge surfaces of said shape project outwardly through the opposite ends of said slot into said injection region; and means for injecting plastic material into said injection region to fill same and weld said preformed shape into an integral structure, said injecting means including an injection nozzle formed in one of said mold elements and in communication with a central portion of said injection region so as to simultaneously provide flow of injected plastic material to those portions of the injection region adjacent the opposite ends of the slot.

References Cited

UNITED STATES PATENTS

| | | | |
|---|---|---|---|
| 3,154,617 | 10/1964 | Schenk et al. | 264—328 X |
| 2,154,749 | 4/1939 | Hines | 164—108 X |
| 2,607,957 | 8/1952 | Danielson et al. | 264—247 X |
| 2,637,073 | 5/1953 | Walther | 264—261 X |
| 3,057,016 | 10/1962 | Schilling | 264—328 X |
| 3,096,146 | 7/1963 | Coale | 264—328 X |
| 3,178,496 | 4/1965 | Ferreira | 264—261 X |
| 3,247,550 | 4/1966 | Haines | 264—277 X |

FOREIGN PATENTS

| | | |
|---|---|---|
| 872,149 | 9/1940 | France. |
| 1,118,823 | 12/1954 | France. |

ROBERT F. WHITE, Primary Examiner

K. J. HOVET, Assistant Examiner

U.S. Cl. X.R.

18—36; 249—85; 264—328

UNITED STATES PATENT OFFICE
CERTIFICATE OF CORRECTION

Patent No. 3,476,852

November 4, 1969

Robert Shattuck

It is certified that error appears in the above identified patent and that said Letters Patent are hereby corrected as shown below:

Column 1, line 61, "palstic" should read -- plastic --. Column 2, line 27, cancel "ram, to kee pthe mold closed as the plastic material is"; line 29, "injecting" should read -- injectio --. Column 5, line 70, "freformed" should read -- preformed --. Column 7, lines 67 to 74 should read -- channels 122, which channels all connect to a rectangular opening 123 formed between the top of the block 117 and the upper mold half 113. The upper mold half 113 has a sprue opening 124 centrally located therein, which opening communicates with the rectangular opening 123 such that the molten plastic material can be injected into the cavity 119 by any conventional injection molding machine, such as described above. Injection of molten plastic material into the cavity 119 causes the outer shell of the casing --; line 75 cancel "FIGURES 4-8 since the preformed shape utilized in". Column 8, line 75, "channels 122, which channels all connect to a rectangular" should read -- FIGURES 4-8 since the preformed shape utilized in --. Column 10, line 59, "sheets by means" should read -- mold by means --.

Signed and sealed this 22nd day of December 1970.

(SEAL)
Attest:

EDWARD M. FLETCHER, JR.
Attesting Officer

WILLIAM E. SCHUYLER, JR.
Commissioner of Patents